United States Patent [19]
Andersen et al.

[11] Patent Number: 6,095,410
[45] Date of Patent: Aug. 1, 2000

[54] VENDING SYSTEM

[75] Inventors: Jesper Nykaer Andersen, Kalvehave; Jesper Schultz, Copenhagen, both of Denmark

[73] Assignee: Dataflight Europe A/S, Birkerod, Denmark

[21] Appl. No.: 08/696,929

[22] PCT Filed: Feb. 23, 1995

[86] PCT No.: PCT/DK95/00081

§ 371 Date: Oct. 7, 1996

§ 102(e) Date: Oct. 7, 1996

[87] PCT Pub. No.: WO95/23390

PCT Pub. Date: Aug. 31, 1995

[30] Foreign Application Priority Data

Feb. 23, 1994 [DK] Denmark .................................. 0224/94

[51] Int. Cl.[7] .................................................. G06K 5/00
[52] U.S. Cl. ............................................ 235/380; 235/384
[58] Field of Search .................................... 235/375, 380, 235/383, 381, 462.45, 472.01, 384; 705/8

[56] References Cited

U.S. PATENT DOCUMENTS

| | | | |
|---|---|---|---|
| 4,841,131 | 6/1989 | Iijima | 235/380 |
| 5,047,615 | 9/1991 | Fukumoto et al. | 235/375 X |
| 5,221,838 | 6/1993 | Gutman et al. | 235/379 |
| 5,235,509 | 8/1993 | Mueller et al. | 364/405 |
| 5,237,487 | 8/1993 | Dittmer et al. | 361/729 |
| 5,250,789 | 10/1993 | Johnsen | 235/383 |
| 5,324,922 | 6/1994 | Roberts | 235/375 |
| 5,408,077 | 4/1995 | Campo et al. | 235/380 |
| 5,424,524 | 6/1995 | Ruppert et al. | 235/383 |
| 5,442,567 | 8/1995 | Small | 235/381 X |

FOREIGN PATENT DOCUMENTS

| | | | |
|---|---|---|---|
| 0213534 | 11/1987 | European Pat. Off. | G07F 7/10 |
| 81/02940 | 10/1981 | WIPO | G07F 7/02 |
| 86/03869 | 7/1986 | WIPO | G07F 7/10 |
| 87/06377 | 10/1987 | WIPO | G06K 15/00 |
| 89/00321 | 1/1989 | WIPO | G07G 1/14 |
| 90/01199 | 2/1990 | WIPO | G07F 7/02 |
| 94/02908 | 2/1994 | WIPO | G06K 5/00 |
| 95/03595 | 2/1995 | WIPO | G07G 1/12 |

*Primary Examiner*—Karl D. Frech
*Attorney, Agent, or Firm*—Klein & Szekeres, LLP

[57] ABSTRACT

A system for performing and recording transactions is used in connection with the vending of articles through vending terminals, especially in vending trolleys on board transportation vehicles, such as airplanes, trains, ferries, and buses. The system includes a computer, a visual display mechanism, and input and output mechanisms. At least part of the input mechanism includes a dynamic key displayed in the display mechanism. The computer includes a random access memory (RAM), and, in a preferred embodiment, the system includes a mechanism for detecting and correcting errors in the RAM that may be introduced by external radiation.

34 Claims, 13 Drawing Sheets

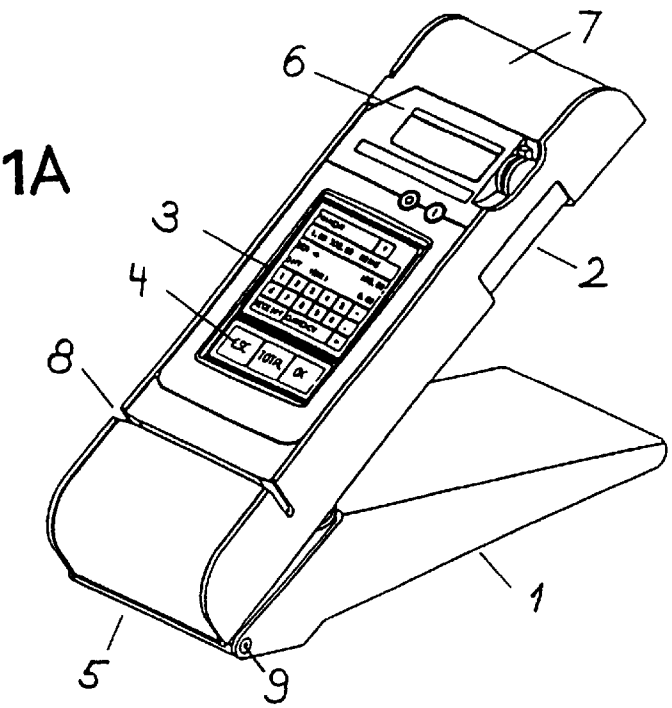
Fig. 1A
Fig. 1B
| ESC | GROUP LIST | TOTAL | PAY | CURRENCY | SERVICE |
|---|---|---|---|---|---|
| <--- (DEL) | RECEIPT | LOG IN | LOG OUT | REFUND | ENTER |
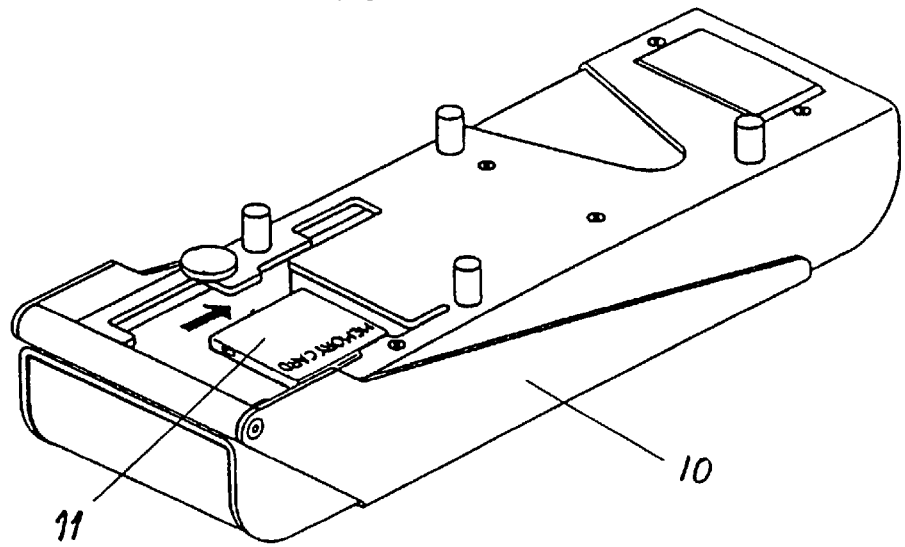
Fig. 1C

Fig. 10A — INITIAL LOG IN PROCEDURE

```
ON BOARD TRADER
*******************
*                 *
* INFLIGHT SALES  *
*    SYSTEMS      *
*                 *
*     V1.00       *
*******************

READ ID CARD
```

Fig. 10B — LOGIN MENU

| 23/02/1994 | 0:00:00 |
|---|---|
| FLIGHT | SK1234 |
| DEP.DATE | 23/02/1994 |
| DEP.STAT | CPH |
| CURRENCY | DKK |

| 1 | 2 | 3 | 4 | 5 |   |
|---|---|---|---|---|---|
| 6 | 7 | 8 | 9 | 0 | ← |

Fig. 10C — MAIN MENU (TOTAL)

| TOTAL | ↑ | ↓ |
|---|---|---|
| 2 KENZO TIES | | 480.00 |
| 1 DIOR EQUITE S | | 165.00 |
| 1 BEER | | 5.00 |
| 1 CHRONOGRAPH | | 330.00 |
| TOTAL DKK | | 980.00 |

Fig. 10D — ITEMS

| DKK | ↑ | ↓ |
|---|---|---|
| − 1 CHRONOGRAPH SW + | | |
| ATTWOOD PANDA B | | 285.00 |
| CHRONOGRAPH SWA | | 330.00 |
| DISNEY WATCH BL | | 195.00 |
| MAJORICA EARRIN | | 285.00 |
| MAJORICA NECKLA | | 535.00 |

Fig. 10E — ITEM GROUPS

| ITEM GROUPS | ↑ | ↓ |
|---|---|---|
| − 1 CHRONOGRAPH SW + | | |
| CONSUMTION | EXCLUSIVE | |
| FRAGRANCES | COSMETICS | |
| A / SHAVE | SPIRITS | |
| CIGARETTES | CHOCOLATE | |
| | | |

SEAT IDENTIFICATION

| SEAT NO: | 3B | | ↑ | ↓ | |
|---|---|---|---|---|---|
| DELETE PAX | | SELECT PAX | | NEW PAX | |
| 1A | 2C | 3A | 7E | 10A | 10B |
| 11E | 13A | | | | |
| | | | | | |
| | | | | | |

Fig. 11A

NEW SEAT IDENTIFICATION

| ENTER NEW SEAT NUMBER | | | | | |
|---|---|---|---|---|---|
| 15B | | | | | |
| A | B | C | D | E | F |
| G | H | I | J | K | L |
| 1 | 2 | 3 | 4 | 5 | |
| 6 | 7 | 8 | 9 | 0 | ← |

Fig. 11B

PAYMENT

| PAYMENT | | | ↑ | ↓ |
|---|---|---|---|---|
| 1.00 | 500.00 | COINS | | |
| DEM * | | | | 100.00 |
| DKK | DINERS | | | 588.00 |
| DKK | | | | 0.00 |
| 1 | 2 | 3 | 4 | 5 |
| 6 | 7 | 8 | 9 | 0 | ← |

Fig. 11C

CURRENCY

| CURRENCY | | ↑ | ↓ |
|---|---|---|---|
| DKK | 100.00 | SEK | 81.96 |
| NOK | 90.40 | USD | 606.00 |
| DEM | 392.00 | GBP | 913.00 |
| FIM | 107.00 | IEP | 954.00 |
| FRF | 116.06 | BEC | 19.09 |
| NLG | 349.46 | ITL | 0.40 |

Fig. 11D

LOG OUT PROCEDURE

```
      ON BOARD TRADER

*********************
    *                   *
    *     LOG OUT       *
    *                   *
    *********************

READ ID CARD

OR PRESS HERE
```

Fig. 11E

VENDING SYSTEM

BACKGROUND OF THE INVENTION

The present invention relates to a system for performing and recording transactions in connection with vending of articles, in particular for use in connection with "on board vending", that is, in connection with vending terminals, especially vending trolleys on board transportation means such as aircraft, trains, ferries, buses, etc.

It is known to use computers with entry keys, bar code readers, displays, printers, etc. for performing and recording transaction in connection with on board vending.

For example in GB 2 205 428, an application of a hand-held data terminal (Psion Organiser II) for sales on aircrafts is disclosed. This data terminal provides the user with a limited input/output flexibility and the dynamic key concept described below is not provided.

In WO 86/03869 a pocket-sized personal terminal adapted to be used in connection with different financial transactions is disclosed. A menu driven application utilizing the dynamic key concept is also disclosed. However, the specific problems associated with on board vending is not discussed in this document.

As the vending activity in on board vending environments will often take place under difficult conditions with respect to space and time constraints, and as there is a demand for an increasing efficiency in the on board vending so that all passengers will be offered the opportunity of buying their needs even during short trips such as short flights, there is a demand for on board vending systems which are very easy to operate after a short learning period, yet able to perform all the necessary single and combined transactions which will be required in a modern vending environment. The present invention fulfils this demand and provides a system for performing and recording transactions in connection with the vending of articles, which system ensures a concentrated functionality and a very easy understanding and operation.

SUMMARY OF THE INVENTION

In one aspect, the invention relates to a system for performing and recording transactions in connection with vending of articles, the system comprising computer means, display means, input means and output means, at least part of the input means being constituted by a dynamic key displayed in the display means, the dynamic key showing at least one of the features a)–d)

a) the label of the dynamic key has a content which is related to the context in which the key is displayed, and the dynamic key is activatable to cause input to the computer means by interaction, by external pointing means, with at least part of the display area occupied by the key, b) the label of the dynamic key shows identification of a type of article together with the number of articles of the type, activation of the key causing incrementation or decrementation of the number of articles of the type to be input to the computer means, c) the label of the dynamic key shows identification of a type of article together with the price, in a selected currency, of an article of the type or (where the number of articles of the type is also shown in the label) of the number of articles of the type, d) the label of the dynamic key shows the designation of a type of information together with specific information of the type, activation of the key permitting change of the specific information.

As will be understood from the following discussion, these features, either alone or in combinations, preferably in combinations where at least the feature a) and more preferably at least the features a) and b) is/are included, permit an extremely simple and safe, yet very effective and advanced, operation of the vending system.

In the present specification and claims, the term key, when used in connection with a key displayed in the display, designates a distinct field of the display allocated to one item of information or connected items of information, such as:

a) one item of information, e.g.:
   an arrow key
   the name of a type of article
   the designation of a currency
   a seat identification
   a message
   a help screen b) connected items of information, e.g.:
   the name of a type of article in connection with the price of the article
   the number of articles of a type in connection with the price of the number in question of articles
   a question connected with the possible answers
   the designation of a type of information together with the specific information, such as:
   "DATE" together with the actual date,
   "FLIGHT" or "TRAIN" or "FERRY" together with tie actual identification, or
   the designation of a currency in connection with an amount in the currency, the display key constituting an input means to the computer means.

The distinct field can be graphically highlighted by means of a boundary, and/or a raster, and/or a colour, or it can be distinguished as a single line. The field defining the key can also be divided in subfields or subkeys, but is still to be considered one key in the context of the present definitions.

The term "dynamic", as used in connection with a display key, indicates that the key shows a label which can be exchanged in dependence of the context in which the key is displayed, and/or the contents of which label consists of several elements of which at least one can be changed or exchanged completely or partially independently of the other one or others.

One special type of dynamic display key is a dedicated input key, e.g. for a credit card number or a flight number, containing a prompt for the input and a display of the information input. This kind of key can suitably cooperate with a set of display keys which are displayed only when needed and which each contain one selection of information that can be input, e.g. numeric keys for inputting amounts or alphanumerical keys for inputting departure station, carrier identification, etc.

With respect to feature a) above, the dynamic key having a context-relevant label is a key which is activatable by any kind of external interaction with the display area occupied by the key or constituting the key, or with at least part of the display area (which is critical in some cases, vide the discussion of incrementing or decrementing in the following) The term "external pointing means" is used to indicate that the pointing means is not merely e.g. a bar or arrow on the screen, but is actually a physical pointing means pointing at and activating the key by interaction with at least part of the key area. The external pointing is suitably a tactile pointing means, such as simply a finger or pointer touching and/or lightly pressing against at least part of the area occupied by the key. "Touchscreens" are well known in the art and may be implemented in a number of ways, for example by means of a grid of infrared light sources and corresponding infrared detectors at the edges of the display, or by means of a fluid "plasma" which causes change of electrical properties of a screen area when compressed; it will be understood that the exact manner in which the tactile or other activatability of the display key is provided is not of importance in connection with the present invention, as long an effective and precise function of the tactile display key is obtained. Other suitable display keys activatable by interaction, by external pointing means, with at least part of the key area, are keys which are activatable by means of light, by magnetic means, or by electrical means.

The combination of activatability by direct external pointing means, suitably simply by touching with a finger, and the context-related label results in an ease, safety and efficiency in operation which is extremely valuable in the otherwise often stressed situations which can occur in on board vending.

With respect to feature b) above, it is considered very valuable that the operation is as simple as possible with respect to the kind of activity for which the system is intended. One way of obtaining this is to adapt the system to the case where the individual customer in question will purchase one or a few of a particular type of article. This means that normally, the system is adapted to display the number 1 in association with the identification of a type of article selected, a higher number than one being input simply by incrementing the number by activation of an area of the dynamic key which is associated with incrementation. Most often, any number higher than 1 wanted will be a small number, such as 2 or 3 or 4, so that the incrementation is the fastest and safest way—and the way most practical and comfortable to the operator—of inputting the number in question. If the operator "overshoots", it is easy to correct the number by activating the part of the key which decrements the number. If desired, decrementing to a negative number could indicate that the customer in question is returning an article or articles bought previously, e.g. at an earlier time during the voyage in question. As a suitable example, the key could be a line of a "total" screen, the line containing the number, the identification of the article, and the price, and incrementation could be performed by activating the right part of the key which shows the number, whereas decrementation could be performed by activating the left part of the key which shows the price. In cases where larger numbers might be relevant, a part of the key area could be allocated to an activatable toggling between a condition where the incrementation/decrementation is performed and a condition where the number could be inserted from a numerical keyboard.

With respect to feature c) above, it is highly preferred that information about the price of a type of article is displayed in the selected currency together with the information about the identity of the type of article in a dynamic key on the display of the computer, so that the price is always immediately available to the operator in the most relevant place and in the desired currency. In the contexts where the number of articles of the type is displayed as part of the key, the price will be the price for the number in question in the selected currency.

With respect to feature d) above, the above-mentioned keys for inputting e.g. an amount in a currency or a flight, train, ferry or bus number are examples of extremely userfriendly input keys which because of their construction will contribute to faster and safer input of these more complex combinations of information than in known on board vending systems.

In most on board vending systems, most of the information about articles to be sold is entered by means of a bar code reader or another code sensor adapted to sense identification information from articles to be selected, and this will also normally be the case for the system according to the invention. Thus, in most practical embodiments of the system, the input means additionally comprise a code sensor adapted to sense identification information from articles to be selected. The code sensor may, e.g., be a code reader or code scanner such as a bar code reader, a bar code scanner or a magnet code reader. When a physical article has been selected by the operator and its type sense by means of the code sensor, the input from the code sensor will suitably result in selection of one piece of the article in question for sale, repeated input from the code sensor incrementing the number of articles of the type by one for each input.

A particular useful application of a code sensor is in connection with sales of pre-pack, i.e. pre-pack contains a set of articles a passenger has ordered before his trip to be delivered during the trip. The pre-packed set of articles may carry identification information, such as a list of the articles contained in the package, the price of each article, the total price of the pre-pack, the receiver of the prepack, etc. The pre-pack may be sold and the identification information sensed by the code sensor at any point during sales of other articles to or other transactions with the customer in question. The pre-packed articles may be handled by the vending system as if they were sold one by one to the customer or in a more simple version of the on board vending system, the pre-pack may be handled as a single article.

Normally, a large proportion, and perhaps the majority, of articles sold in the vending system will be entered by means of a code sensor, but in many situations manual input from the display is necessary or suitable, e.g.:

1) where the physical article is not supplied with any code, or the code has been damaged,
2) where the number input from the code sensor must be decremented,
3) where the sales discussion with the customer has been based on a display list of types of articles with appertaining prices.

In addition to this, manual input is, of course, necessary to enter information about the currency in which payment is made, in connection with identification of the passenger in the seat or position in question (although this could be by means of a code reader if the seats or positions are identified by means of codes, or the passengers themselves could be identified on the basis of codes on e.g. their boarding pas)

in connection with log in procedures, including entering information about departure station, flight, train, ferry or bus number and departure date, correction of time and date, refund of goods to customers who have changed their mind, etc., etc.

To accommodate modern credit and pay card systems, the input means of the system according to the invention will normally additionally comprise an electronic payment medium station. The electronic payment medium station can be a credit card reader and/or a pay card reader/writer, but it could also be a station connected to a wireless credit or pay system. Input from an electronic credit card reader will replace a manual credit card payment device and produce the necessary paper for signature, etc., and, at the same time, record the manner of payment of the amount in question.

An important additional input/output means in most on board vending systems according to the invention is a memory media reader/writer, such as a memory card reader/writer for any suitable type of memory card or chip, such as CMOS-RAM, SRAM, ELPROM, FLASH EPROM, etc. The memory media, such as memory card, is the preferred source for data (such as item list, prices, currency exchange rates, etc.) for use in the transactions and can be updated from a central or decentral source.

Similarly, the memory media is the presently preferred media for storing transactions performed during a vending session or over a period of time. Transactions can be aggregated from several vending stations by moving one memory card from station to station and extracting their transactions, or one vending station can be designated as a master and the cards from the other stations with their stored transactions can be entered one by one.

The on board vending system may also be provided with interface means so that a plurality of vending systems may be interconnected through a local area network enabling communication between a plurality of on board vending systems. Further, a server may be connected to the local area network, for example with the on board vending systems connected in a client/server architecture. Hereby, it will be possible to collect, on the server, information of transactions from all on board vending systems operating on a transport means. Further, it will be possible for each on board vending system to read information from the server, such as credit card black-listing information, currencies, etc. It will also be possible for the on board vending systems to keep track of transactions between two different on board vending systems, such as exchanges of money of different currencies, exchange of articles, etc.

The communication with the local area network may be wireless communication, such as infrared communication, radio wave communication, ultrasonic communication, etc.

Physically, the computer means of the system according to the invention is suitably a portable computer, such as a battery powered computer, in particular where the vending system is to be used on a movable trolley or in places where mains power is not readily available. When the system is arranged on a vending trolley or another support, it is suitably adjusted with respect to the angle of inclination of its screen so that it is adapted to the height of the operator, and/or, for e.g. an LOD screen, the angle of the crystals is adapted to the illumination where the screen is to be used.

During development of the present invention, it was discovered that the RAM memory of the on board vending system was sensitive to nuclear radiation at a level experienced at normal cruise altitudes of passenger aircrafts. Therefore, error detection and correction codes were developed for the on board vending system so that the system could be applied in a passenger aircraft during flight without possible loss of data.

The most important feature of the error detection and correction codes developed is that they ensure that a RAM-based program with an error or RAM-based data with an error do not cause further destruction of data in the on board vending system. Further, it is required that the codes should have a low execution time and a low memory overhead.

According to a preferred embodiment of the invention, the program of the on board vending system, including the error detection and correction codes, resides in RAM memory. Thus, the error detection and correction codes may themselves contain an error. Therefore, in order to minimize the risk that an error destroys the error detection and correction code itself, the error detection and correction is performed successively starting with execution of a very small first program that performs a simple checksum test of the next second program to be executed. Presently, the part of the first program that detects errors in the second program is stored in at most 22 bytes of the RAM memory. The remaining part of the first program comprises an error handling routine. Because of its small size, the probability of an error occurring in this error detection program segment is, very low. If an error occurs in this segment of the RAM memory, it is presently preferred to power down the on board vending system, i.e. no error correction is performed by the first program.

If the first program does not detect errors in the second program, the next step of the error detection and correction is performed, whereby the second program checks a third program for errors. The third program is split into specific blocks and the second program performs a checksum test on each block of the third program.

The checksum test may comprise the steps of first summing all the bytes in a block and then comparing the result of the summation with the known correct checksum. However, any arithmetical operation may be applied in the checksum test, such as addition, subtraction, exclusive or-ing, etc.

The checksum test presently preferred comprises simultaneous calculation of a first and a second checksum. The calculation of the first checksum comprises the steps of xor-ing two consecutive 16-bit bytes together, and, if the result has an even parity, shifting the result one bit to the right (corresponding to a division by 2), or, if the result has an odd parity, shifting the result one bit to the left (corresponding to a multiplication by 2) and then xor-ing the next consecutive byte to the result of this operation until all bytes of the block in question have been included. Calculation of the second checksum (a conientional checksum test) comprises adding two consecutive 16-bit bytes together modulus $2^{16}$ and then adding the next consecutive byte to the result of this operation until all bytes of the block in question have been included. This algorithm has proven highly effective in detecting more than one bit errors in the same block.

According to a preferred embodiment of the invention, two or more versions of the third program reside in the RAM memory, whereby a detected error may be corrected by selecting an error-free version of a specific block of the third program for execution. If one or more errors are detected in all versions of the block in question, it is presently preferred to power down the on board vending system.

Typically, the second program is stored within 128 bytes of the RAM memory.

The last step of the error detection and correction method is to check and correct, by the third programme, the entire RAM memory including the remaining part of the RAM memory containing a program that implements all the functions of the on board vending system.

As the previous steps of the error detection have ensured the correctness of the error detection and correction codes, the entire program may be checked in any conventional way, such as by a cyclic redundancy check (CRC), a Galois field check ($GF(2^8)$), a checksum, etc.

It is presently preferred to perform a Galois field check ($GF(2^8)$), wherein the RAM memory is divided into 248 bytes blocks with four checksum bytes attached to each block. Thereby, it is possible to detect three bit errors and correct two bit errors in a block. This method is selected for its low memory overhead (4 bytes overhead per 248 bytes) and for its fast execution times.

Presently, it is also preferred that each block of the third program comprises a program segment that during execution performs a specific function of the error detection and correction method.

Preferably, a first part of a program segment of the third program contains code relating to detection of errors in the entire program and a second part of the program segment of the third program contains code to be executed in relation to operations to be carried out if an error is detected. The error detection and correction is then done successively in such a way that if no errors are detected by the second program in the first part of the program segment of the third program, this program segment is executed. If, hereby, an error is detected in the entire program, the second part of the program segment of the third program is checked for errors by the second program and is executed if no errors are detected. If an error is detected, another version of the block is checked for errors and executed if no errors are detected or the on board trading system is powered down if errors are detected in all corresponding blocks. Thus, only those program segments that are going to be executed are checked for errors while error correcting parts of the error detection and correction codes that are not going to be executed are not checked for errors.

According to another embodiment of the invention error correction and detection is performed by storing information about the correct content of the RAM memory in a ROM memory.

For example, a Nordstrom and Robinson code may be used in RAM memory, e.g. with a 6 bit Hamming distance between each correct data code, which may be obtained by attaching an 8 bit control byte to each 8 bit data byte of the RAM memory. Then, the combined 16 bit data and control bytes may be used as an address for a ROM, the storage locations of which contain the correct data values corresponding to the combined data and control bytes, this content being transmitted to the processor of the on board vending system. Alternatively, a microcontroller may compare the content of a 8 bit data byte in the RAM memory with the allowed correct data values of the selected data code and based on the comparison forward a correct data value to the processor of the on board vending system. The correct values of the selected data code may be calculated by the microcontroller or it may be stored in a ROM memory.

It is also within the scope of the present invention to include error detection and correction code in the operating system of the controller of the on board vending system residing in a memory that is not susceptible to radiation.

The error detection and correction code may be executed at any convenient time during use of the on board vending system, such as during power up of the system, at regular intervals during operation of the system, after conclusion of each sales operation, after a specific number of power ups of the system, etc.

It is presently preferred to detect and correct bit errors in data files in the RAM memory of the system, disk RAM included, using a conventional method for checking the data byte by byte, such as by using the above-mentioned Nordstrom and Robinson code with 6 bit Hamming distance between the data codes.

It is further preferred to use the third program of the error detection and correction code for error detection and correction in the file allocation table of the disk RAM.

The invention will now be described in greater detail with reference to the drawings, in which

BRIEF DESCRIPTION OF THE DRAWINGS

FIG. 1 is a perspective view of a system according to the invention,

DETAILED DESCRIPTION OF THE INVENTION

Figure 2:
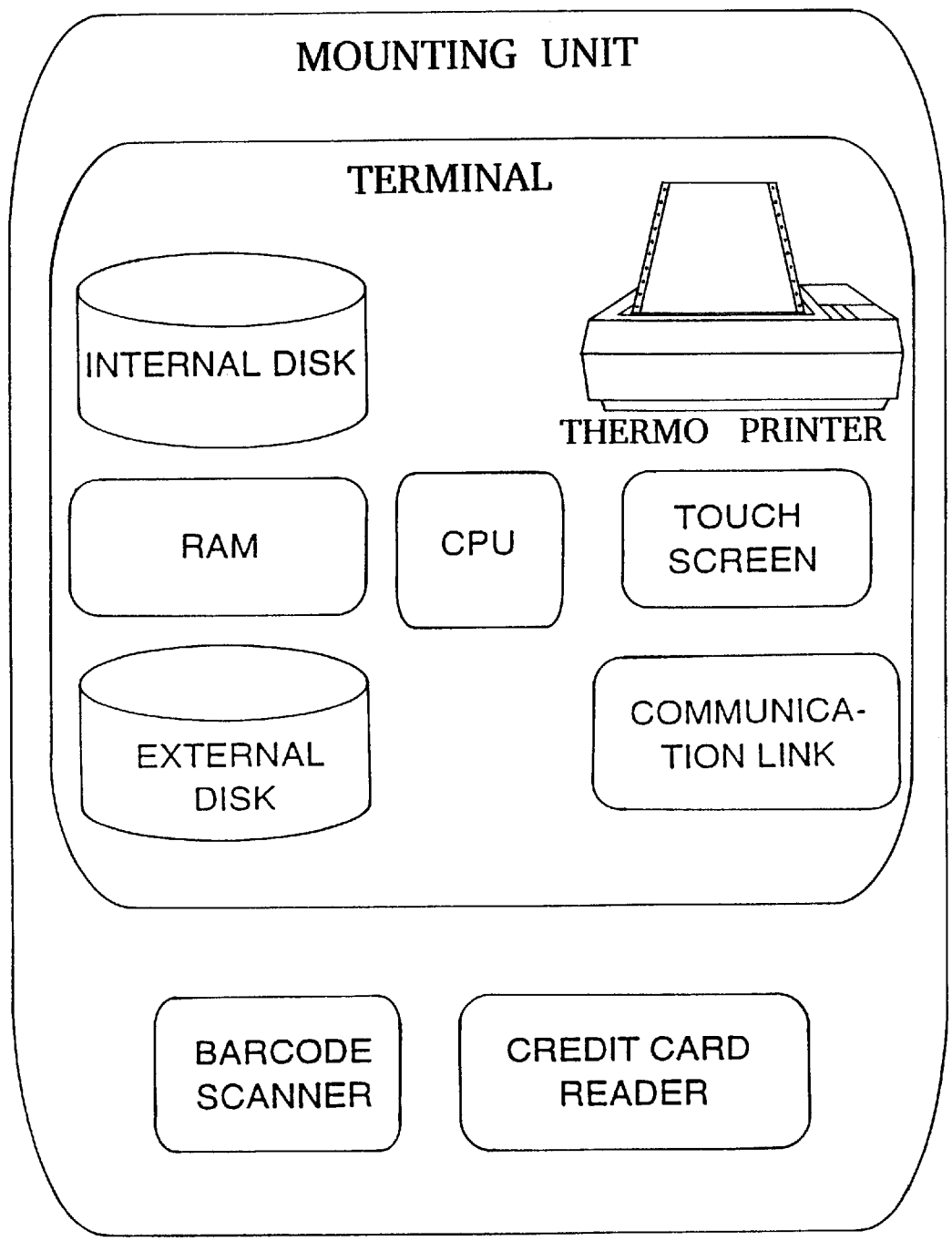
FIG. 2 is a block diagram of the hardware components of a system according to the invention.

In FIG. 1, a system 1 according to the invention comprises a portable computer 2 having a liquid crystal touchscreen display 3 and semi-fixed keys 4 (shown in with labels in 4*a*) A bar code scanner 5 is connected to the computer 2. The computer is equipped with a thermoprinter 6 with a paper roll holder 7 and with a credit card reader 8. As shown in the lower part of FIG. 1, the computer 2 is also equipped with a memory card reader for reading from and writing to a memory card 11. The computer 2 is mounted in a mounting unit 10 comprising two parts rotatable in relation to each other around a shaft 9. The upper part of FIG. 1 shows the system 1 with the mounting unit 10 in an unfolded position for operation of the system 1 with the display 3 positioned in a suitable angle for the operator of the system 1. The lower part of FIG. 1 shows the system 1 with the mounting unit 10 in a folded position for storage of the system 1.

The block diagram of FIG. 2 shows how the various parts of the system are incorporated into one unit. The computer means internally comprises a CPU, RAM, an internal disk (which is a disk, such as a RAM disk, a magnetic disk, an optic disk, etc.), a touchscreen, an external disk (in the form of a memory card) and a thermoprinter. The computer means communicates via a communication link with a bar code scanner and a credit card reader.

Figure 3:
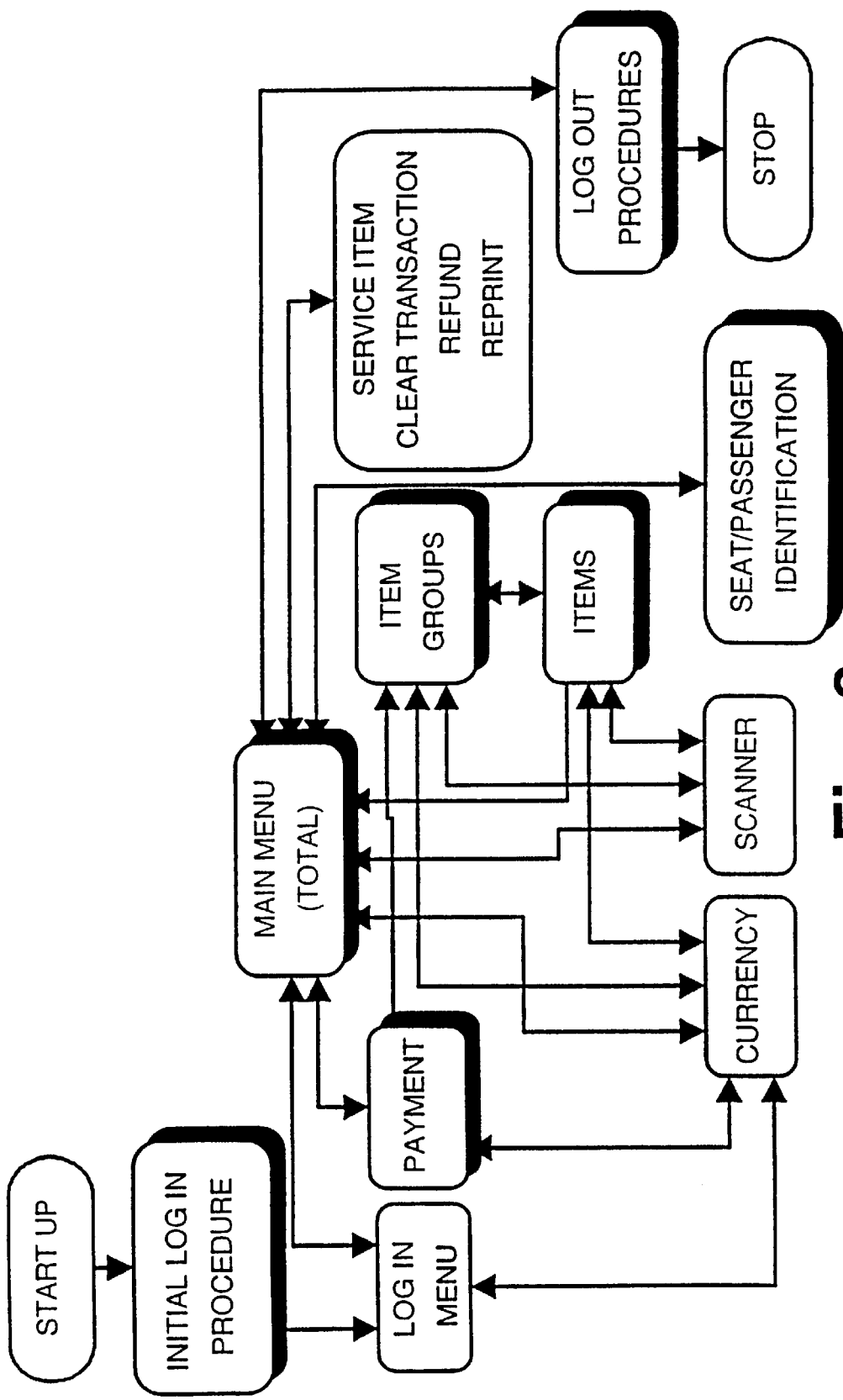
FIG. 3 is a block diagram showing the functionality of an embodiment of the system according to the invention.

FIG. 3 shows an overview of the functionality of a system of the invention. Most of the links shown in FIG. 3 are managed by the semi-fixed keys shown in FIG. 1, the rest being managed by display keys or by a combination of semi-fixed keys and display keys. In principle, all of the links could be managed by display keys.

Figure 4:
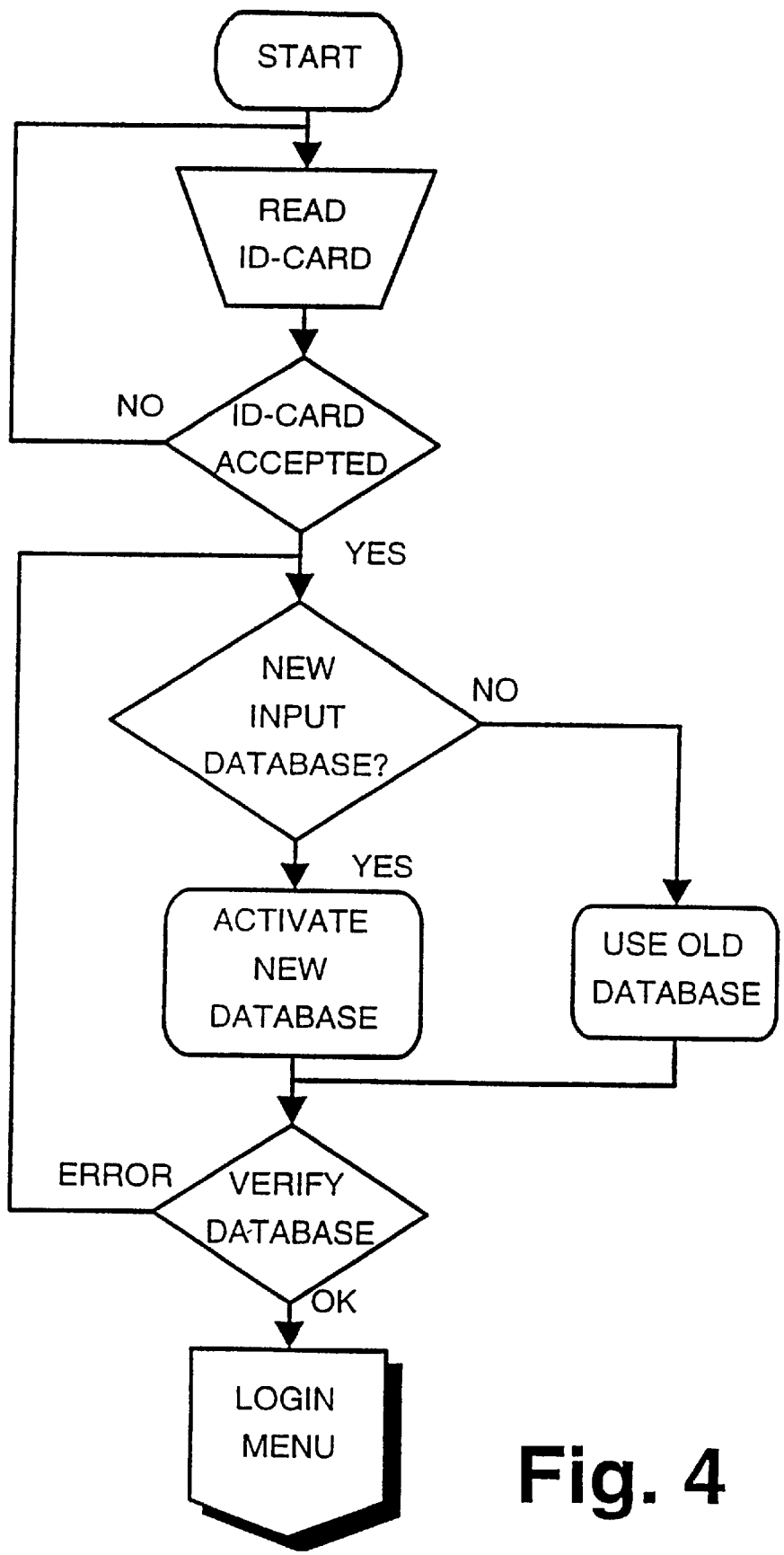
FIG. 4 is a flow sheet illustrating in detail the initial log in procedure of the block diagram of FIG. 3.

The log in procedure illustrated in FIG. 4 starts with reading, in the credit card reader 8, of an ID card of the operator in charge of the on board vending (FIG. 10A shows the corresponding screen dump). When the operator has been accepted, the system checks whether a new item and/or currency database is present on the memory card 11 in the memory card reader/writer. If a new database is present, it is loaded to the internal RAM disk; if not, the system questions whether the old database should be used. Subsequently, the system verifies that a database is present in the RAM disk and proceeds to the log in menu which is illustrated as a screen dump in FIG. 10B. In the log in menu, the operator checks whether the date and time are correct; if not, he activates the dynamic key constituted by the date or time line: activation, by touching either the date or the time, will select the date or the time for correction by means of the numeric display keys shown. Using an analogous procedure, the operator actives the key constituted by the line comprising the designation "FLIGHT" and the indication of the flight number: by touching the line, he makes the flight number indication available to changing by means of the numeric keys; in this case, the letter SK are a fixed part of the display identifying the airline company. When the system is used in other means of transportation, such as trains, ferries, buses, etc., the designation "FLIGHT" is of course changed to an appropriate designation. The two next keys (lines) are updated analogously, except that when touching the DEP.STATE line, the screen changes to a screen containing alphanumeric keys. Touching the CURRENCY line makes the screen change to screen shown in FIG. 11D. As appears from FIG. 11D, DKK has been chosen as the reference currency (exchange rate 100). Any of the other currencies can be selected as the reference currency by touching the dynamic display key (the field) in question, whereby the screen will change back to the screen of FIG. 10B showing the selected currency, and all other screens in the system will from then on by default refer to the selected currency and by default show all prices in that currency.

Figure 5:
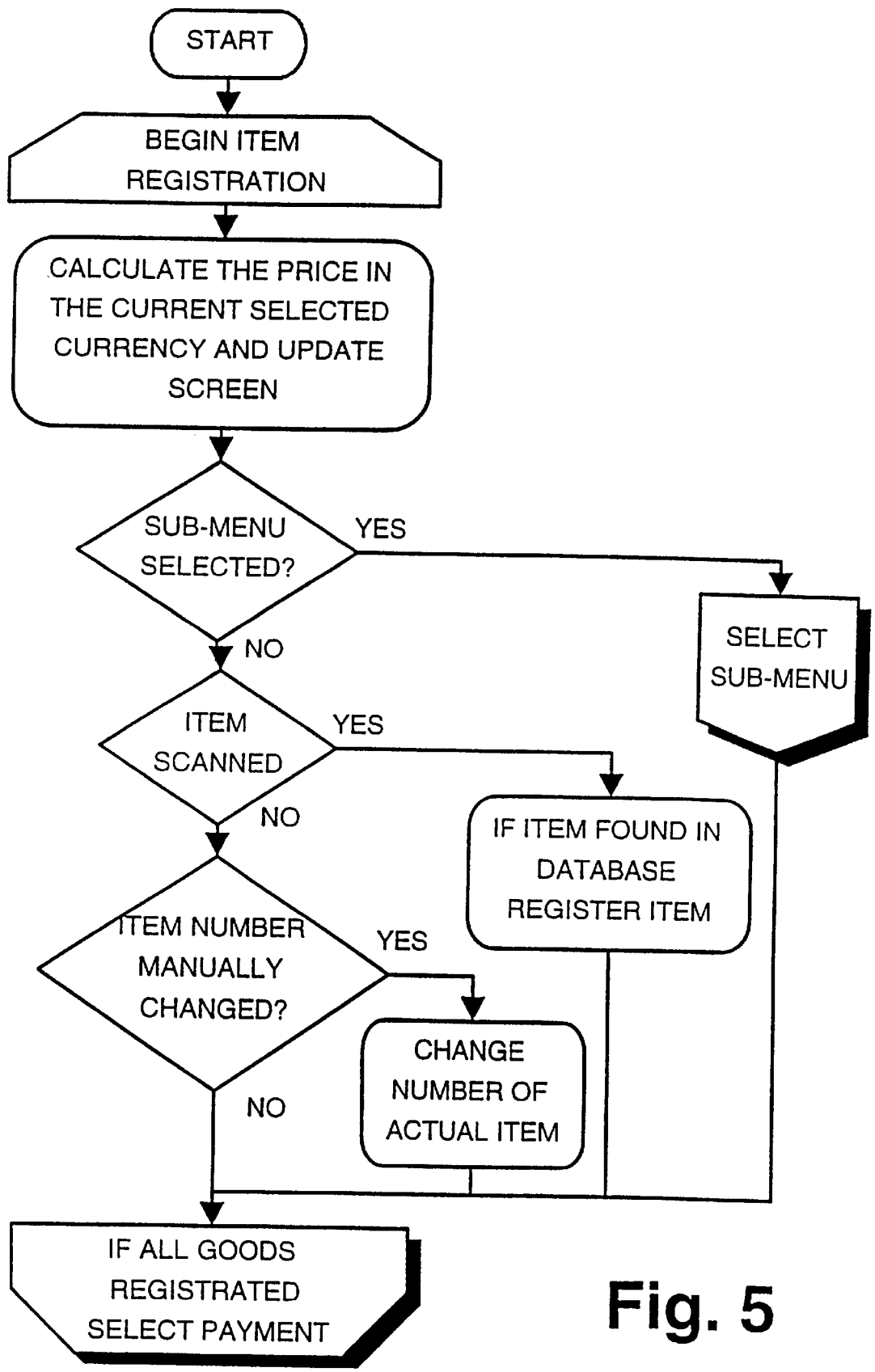
FIG. 5 is a flow sheet illustrating in detail the menu (total) of the block diagram of FIG. 3.

After the log in procedure, the system switches to the main menu which is illustrated by the flow sheet of FIG. 5. The main menu loop will start with the screen of FIG. 10C, but with an empty middle field and an amount of 000.00. After inputting selected articles, either by means of the bar code scanner 5 or manually (will be explained below), the screen may look as illustrated in FIG. 10C, where the two arrow keys in the top line actuate page up and page down, respectively. From the main menu of FIG. 10C, other menus are selected by means of the semi-fixed keys 4, 4a. In the remaining text reference is made to the semi-fixed keys 4a of FIG. 1. FIG. 3 shows which menus can be selected. If, in the example screen shown in FIG. 10C, the operator wants to decrement the number of Kenzo ties to 1, he touches the left side of the key constituted by the KENZO TIES line.

When the operator is satisfied that the items in the TOTAL menu shown in FIG. 10C constitute the correct numbers of the correct items, he activates the PAY semi-fixed key, and the system displays the PAYMENT screen (FIG. 11C) which is described in detail below.

Figure 6:
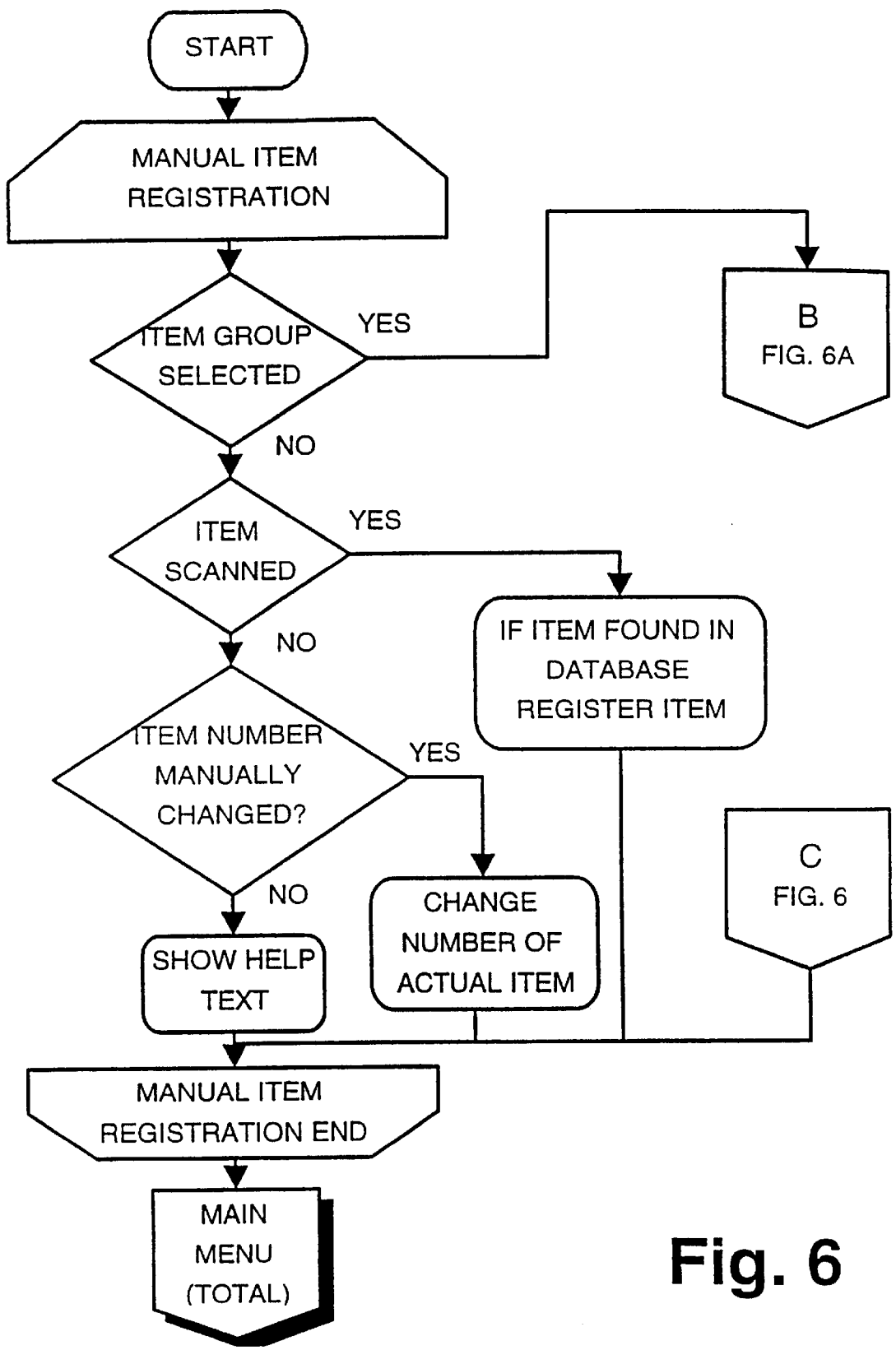
FIG. 6 is a flow sheet illustrating in detail the manual and 6A item registration (item groups and items of the block diagram of FIG. 3)
Figure 6A:
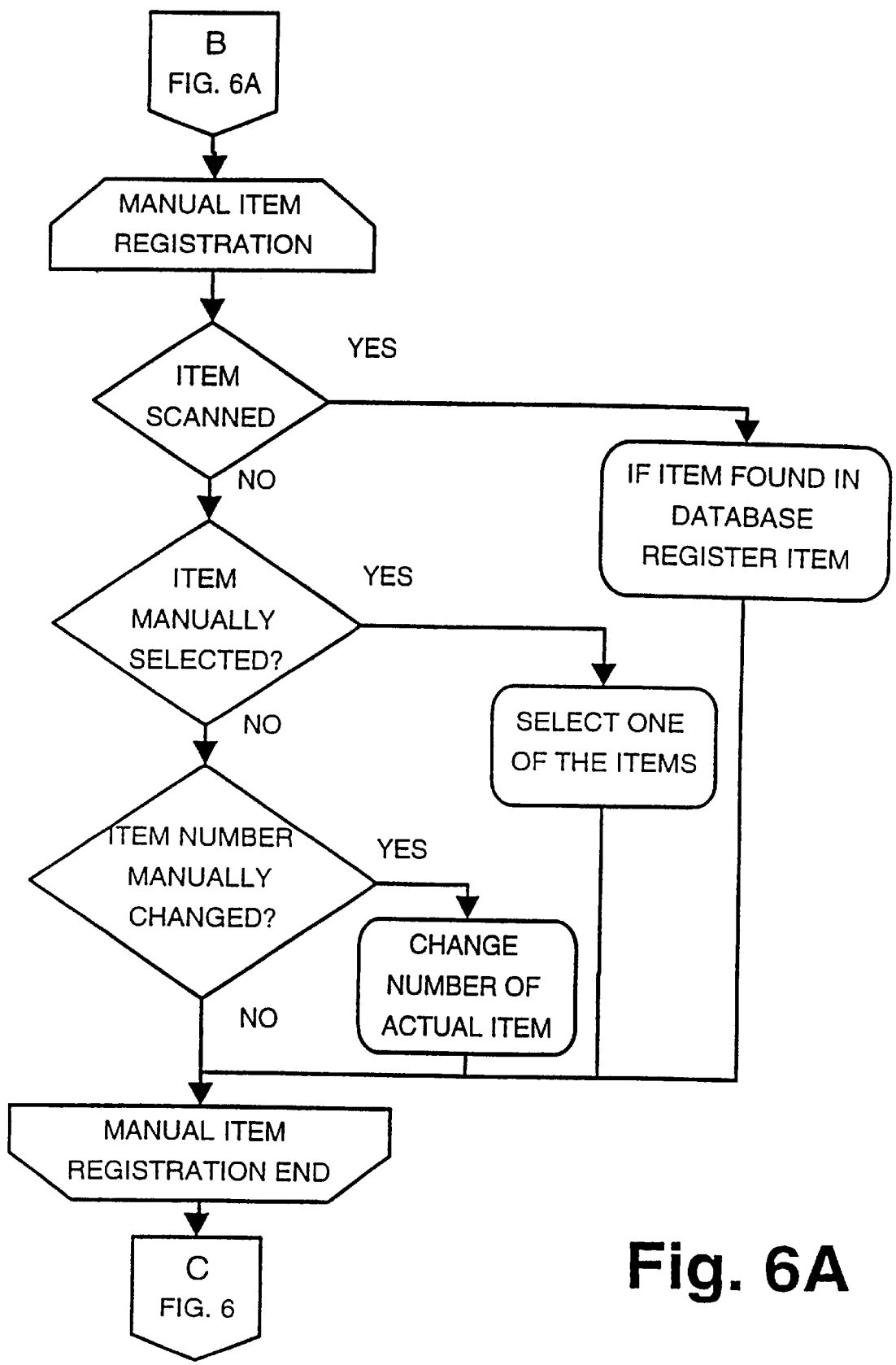

As mentioned above, FIGS. 6 and 6A illustrate the manual item selection flow chart corresponding to ITEM GROUPS and ITEMS of the block diagram of FIG. 3. After pressing of the semifixed key GROUP LIST, the system displays the screen ITEM GROUPS illustrated in FIG. 10E, however with second line empty. On touching one of the dynamic keys (fields) labelled with the main groups, the system displays the corresponding item list. In the example shown (FIG. 10D), the dynamic key EXCLUSIVE of FIG. 10E has been touched, and the item list displays the items pertaining to the group EXCLUSIVE. After touching of the dynamic key (line) containing CHRONOGRAPH SWA(TCH), the display looks exactly as shown in FIG. 10D, the second line showing the selected number of the selected item and allowing change of the number by incrementing (right touch) or decrementing (left touch). Return to ITEM GROUPS is obtained by pressing one of the semi-fixed keys ESC, GROUP LIST and ENTER, and return to the TOTAL menu is obtained by pressing the semi-fixed key TOTAL. If the operator wants to display the prices of the ITEMS menu in a different currency, he touches the semi-fixed key CURRENCY (or the dynamic key (field) in the top line presently showing DKK) whereby the system displays the CURRENCY menu (FIG. 11D) from which the reference currency may be changed as explained above.

Figure 7:
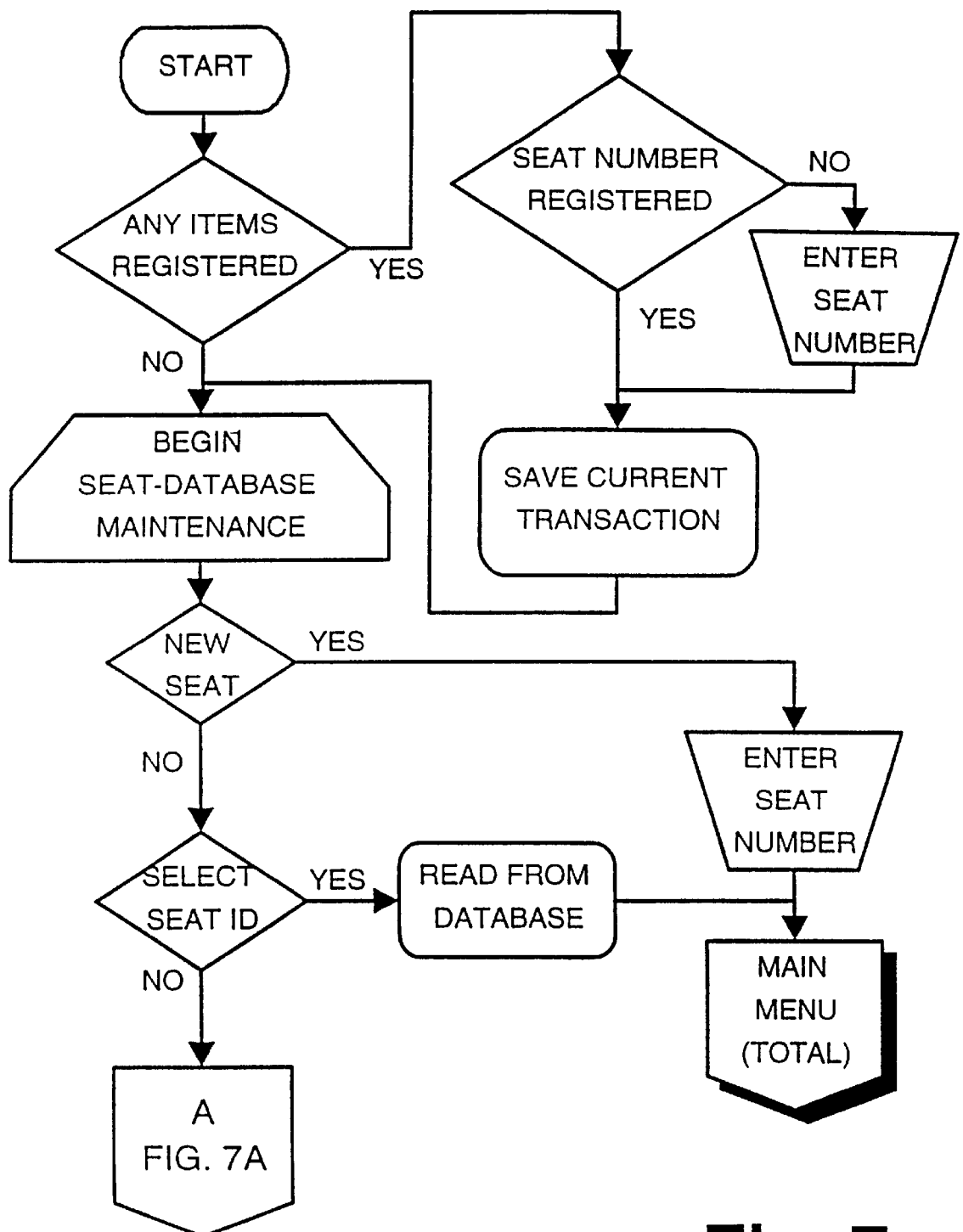
FIG. 7 is a flow sheet illustrating in detail the seat and 7A identification procedure of the block diagram of FIG. 3.
Figure 7A:
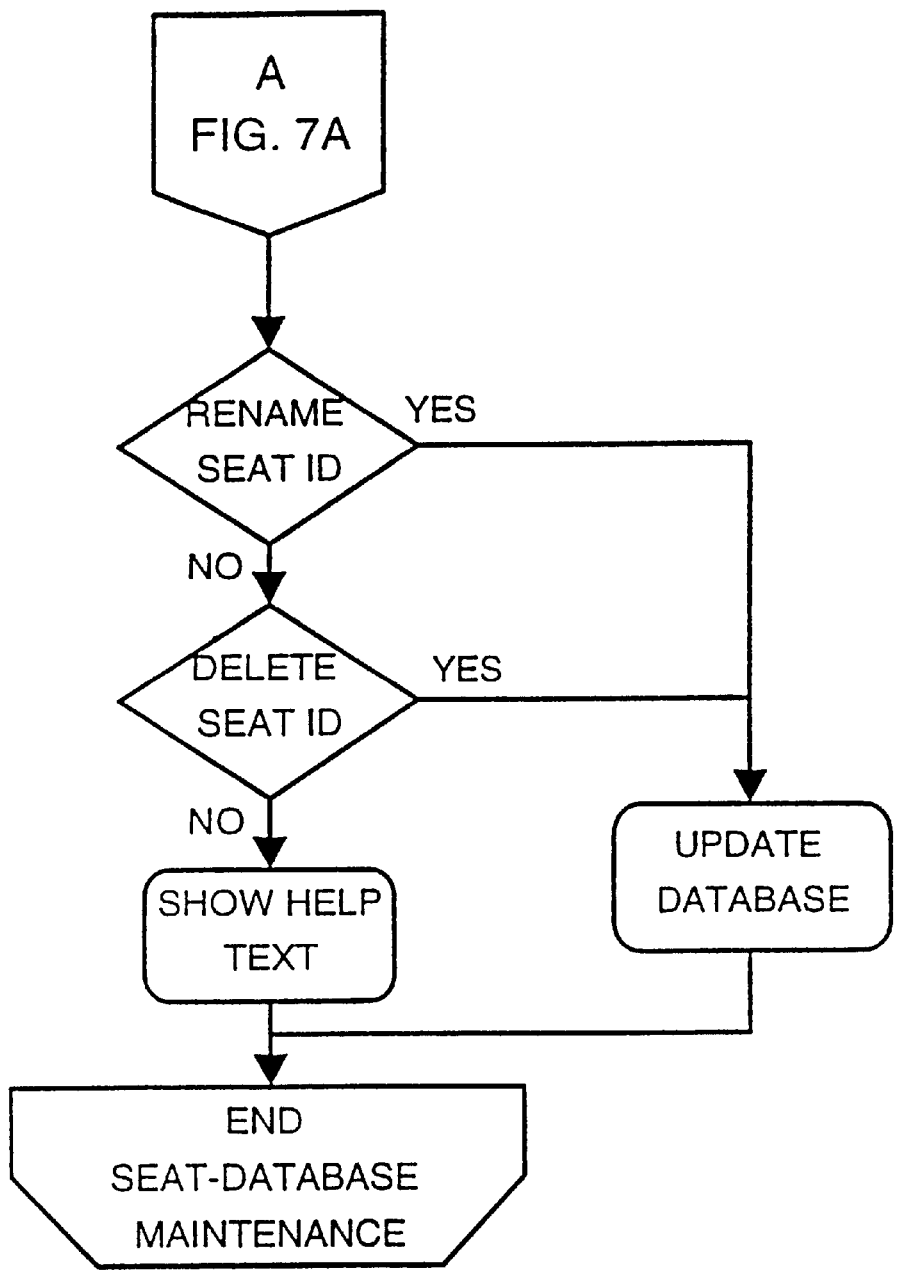

In the seat identification procedure illustrated in FIGS. 7 and 7A, and in the screen dumps in FIG. 11A and FIG. 11B, it is possible to store and retrieve bills under the individual seat numbers.

Figure 8:
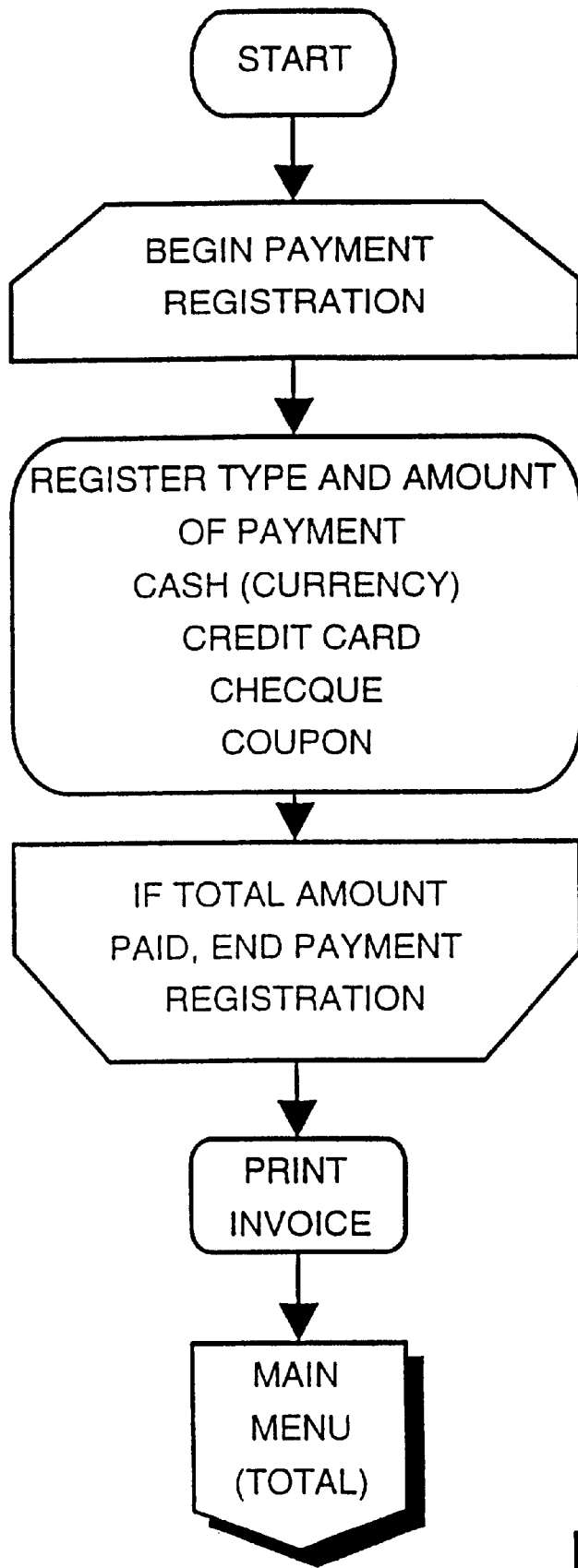
FIG. 8 is a flow sheet illustrating in detail the payment procedure of the block diagram of FIG. 3.

The payment routine illustrated in FIG. 8 starts with a PAYMENT menu (FIG. 11C) showing the amount to be paid in the selected currency. The initial information in the menu will show the amount to be paid in the default currency. By pressing either the semi-fixed key CURRENCY (or, as a special feature, one of the empty lines of the PAYMENT menu), a different payment currency can be selected in the CURRENCY menu. Upon selection of a different currency, the system again displays the PAYMENT menu, this time with the total amount to be paid shown in the selected currency. If the customer pays the amount in question in the selected currency, the operator presses the semi-fixed key RECEIPT, and the system prints an invoice stating the items purchased, the price of the individual items and a summation (in the default currency), and the amount paid, the latter in the payment currency. If the customer does not pay the full amount in the selected currency, the amount displayed is changed by activating the key (line) and changing the amount using the numeric display keys, and the semi-fixed key ENTER is pressed. Then, the system displays the outstanding amount in the default currency, and the procedure may be repeated until the full amount has been paid. Payment may in a similar way be performed by means of a credit card. As a service, the dynamic field in the second line shows which amounts are the minimum and maximum amounts acceptable in the selected currency, and whether coins in the selected currency are accepted.

It will be appreciated that the dynamic display keys play a decisive role in making complex procedures such as the above payment procedure possible, simple and easy.

Figure 9:
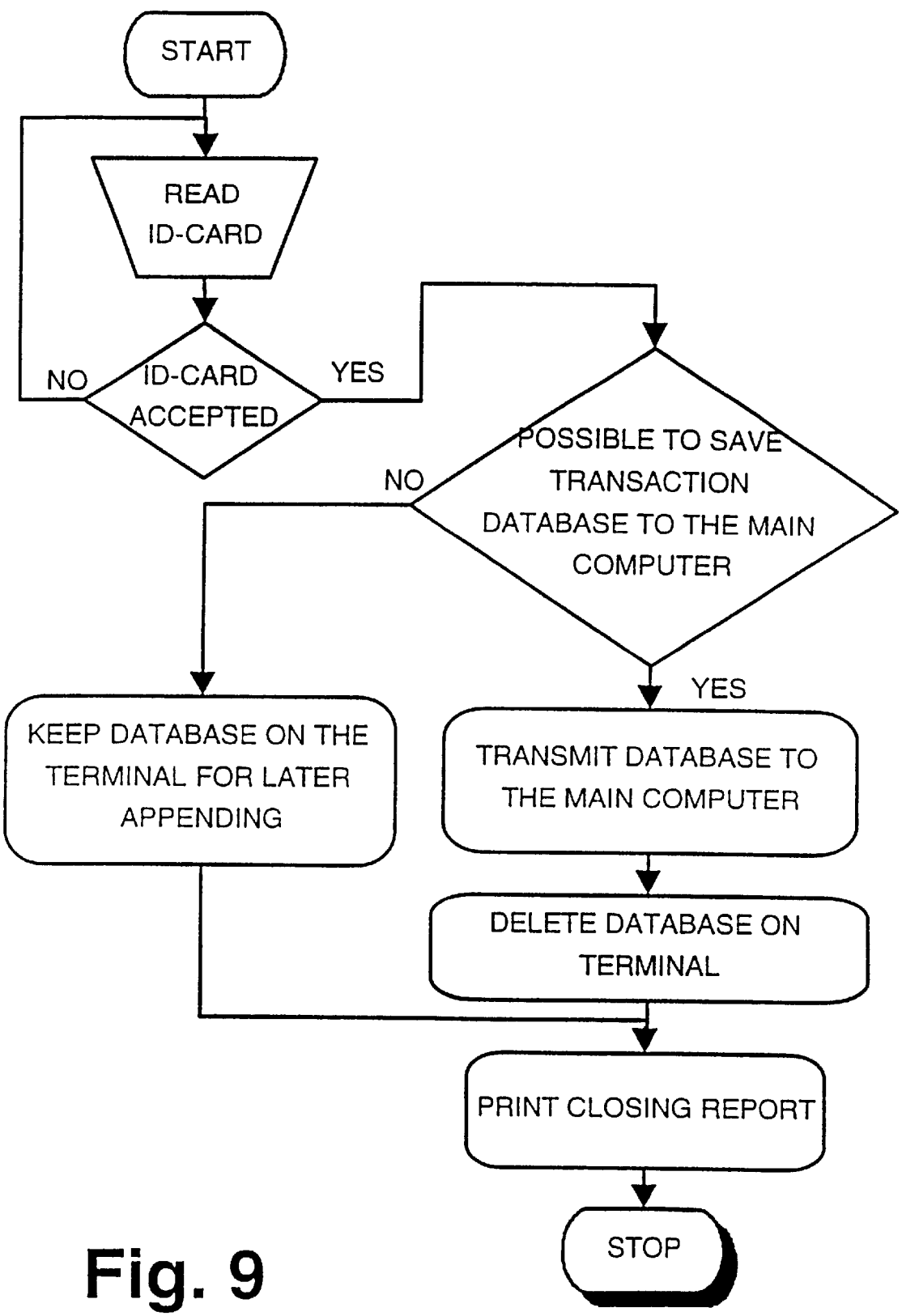
FIG. 9 illustrates in detail the log out procedure of the block diagram of FIG. 3, and FIGS. 10 show screen dumps of parts of the procedures of and 11 the block diagram of FIG. 3.

FIGS. 9 and 11E illustrate the log out procedure. It is seen in the flow chart how the handling of the log out proceeds in detail.

While the above description deals with a vending system, in particular an on board vending system, it will be understood that the principles of the invention could also be utilized in connection with other systems where analogous problems are to be solved.

What is claimed is:

1. A system for performing and recording transactions in connection with the vending of articles,
   the system comprising computer means, display means, input means and output means,
   at least part of the input means comprising a dynamic key displayed in the display means, the dynamic key having a label;
   the content of the label being related to the context in which the key is displayed, wherein the dynamic key is activatable to cause input to the computer means by interaction, by external pointing means, with at least part of the area of the display means occupied by the key, the dynamic key being selected from the group consisting of:
   a) a dynamic key having a label with an identification of a type of article together with a selected number of articles of the type, activation of the key causing incrementation or decrementation of the number of articles of the type to be input to the computer means, b) a dynamic key having a label with an identification of the type of article together with the price, in a selected currency, of an article of the type or (where the number of articles of the type is also shown in the label) of the number of articles of the type, and c) a dynamic key having a label with a designation of a type of information selected from the group consisting of: identification of means of transportation, currency, date, time, seat identification, passenger identification, and departure station, together with specific information of the type, activation of the key permitting change of the specific information.

2. A system according to claim 1, wherein the label of the dynamic key shows a content which is related to the context in which the key is displayed, and wherein the dynamic key is activatable by tactile means to cause input to the computer means by interaction, by external pointing means, with at least part of the area of the display means occupied by the key.

3. A system according to claim 1, wherein the label of the dynamic key shows a content which is related to the context in which the key is displayed, wherein the dynamic key is activatable to cause input to the computer means by interaction, by external pointing means, with at least part of the area of the display means occupied by the key, and wherein the dynamic key is a key which is activatable by means selected from the group consisting of light, magnetic means, and electrical means.

4. A system according to claim 1, wherein the label of the dynamic key shows an identification of a type of article together with the number of articles of the type, activation of the key causing incrementation or decrementation of the number of articles of the type to be input to the computer means, and wherein the number of articles is either incremented or decremented depending upon which particular area of the key is activated.

5. A system according to claim 1, wherein the label of the dynamic key shows a designation of a type of information together with specific information of the type, activation of the key permitting change of the specific information, and wherein the change of the specific information is input from a set of numeric or alphanumeric keys.

6. A system according to claim 5, wherein the numeric or alphanumeric keys are display keys displayed only when needed.

7. A system according to claim 5, wherein the designation of a type of information is designation of a currency, and the specific information changed is an amount in the currency.

8. A system according to claim 1, wherein the input means additionally comprise a code sensor adapted to sense identification information from articles to be selected.

9. A system according to claim 8, wherein the code sensor is a code reader or code scanner such as a bar code reader, a bar code scanner or a magnet code reader.

10. A system according to claim 1, wherein the input means additionally comprise an electronic payment medium station.

11. A system according to claim 10, wherein the electronic payment medium station is a credit card reader.

12. A system according to any of the preceding claims, wherein the input means additionally comprise a memory media reader.

13. A system according to claim 12, wherein the memory media reader is a memory card reader.

14. A system according to claim 12, wherein data for use in the transactions are obtainable from a memory media in the memory media reader.

15. A system according to claim 1, wherein the output means additionally comprise a memory media writer.

16. A system according to claim 15, wherein the memory media writer is a memory card writer.

17. A system according to claim 16, which is adapted to store transactions performed during a vending session or over a period of time on a memory media in the memory media writer.

18. A system according to claim 1, wherein the computer means is a portable computer.

19. A system according to claim 18, wherein the portable computer is battery powered.

20. A system according to claim 18, wherein the portable computer is arranged on vending trolley and adjusted with respect to the angle of inclination of its screen.

21. A system according to claim 1, which comprises means for detecting, in RAM means incorporated in the system, RAM errors introduced by external radiation.

22. A system according to claim 21, wherein the RAM errors are RAM errors introduced by radioactive radiation.

23. A system according to claim 21, wherein the means for detecting RAM errors are activatable at least once during a program execution session.

24. A system according to any of claim 21, wherein means for detecting RAM errors comprise logic circuit means connected to the RAM means and to ROM means, the ROM means containing information permitting detection, by the logic circuit, of RAM errors.

25. A system according to any of claim 21, wherein the means for detecting RAM errors comprise a RAM section containing information relating to the size and checksum of a segment of a RAM-based program to be run by the system, the system comparing the information of the RAM section with the actual checksum detected from the segment of the RAM-based program.

26. A system according to claim 25, wherein the means for detecting RAM errors comprise several RAM sections containing information relating to the size and checksum of corresponding RAM-based program sections, the first program section being of a smaller size than a later program section.

27. A system according to claim 26, wherein a later program section is present in the RAM in duplicate or in a higher number.

28. A system according to claim 21, which comprises means for correcting RAM errors detected.

29. A system for performing and recording transactions in connection with the vending of articles, the system comprising computer means, display means, input means and output means, at least part of the input means comprising:

a dynamic key displayed in the display means, the dynamic key being activatable to cause input to the computer means by interaction, by external pointing means, with at least part of the area of the display means occupied by the key;

the dynamic key having a label, the contents of the label being related to the context in which the dynamic key is displayed, the dynamic key being selected from the group consisting of:

a) a dynamic key having a label with an identification of a type of article together with the number of articles of the type, activation of the key causing incrementation or decrementation of the number of articles of the type to be input to the computer means, b) a dynamic key having a label with an identification of the type of article together with the price, in a selected currency, of an article of the type or (where the number of articles of the type is also shown in the label) of the number of articles of the type, and c) a dynamic key having a label with a designation of a type of information selected from the group consisting of: identification of means of transportation, currency, date, time, seat identification, passenger identification, and departure station, together with specific information of the type, activation of the key permitting change of the specific information;

the dynamic key being further activatable for the selection of a reference currency, whereby prices of articles are displayed in the reference currency.

30. The system of claim 29, further comprising a currency menu with a plurality of second dynamic keys, each of which has a label indicating a respective reference currency, wherein a desired reference currency is selected by activating a selected one of the plurality of second dynamic keys.

31. A system for performing and recording transactions in connection with the vending of articles, the system comprising computer means, display means, input means and output means, at least part of the input means comprising:

a dynamic key displayed in the display means, the dynamic key being activatable to cause input to the computer means by interaction, by external pointing means, with at least part of the area of the display means occupied by the key;

the dynamic key having a label, the contents of the label being related to the context in which the dynamic key is displayed, the first dynamic key being selected from the group consisting of:

a) a dynamic key having a label with an identification of a type of article together with a selected number of articles of the type, activation of the key causing incrementation or decrementation of the number of articles of the type to be input to the computer means, b) a dynamic key having a label with an identification of the type of article together with the price, in a selected currency, of an article of the type or (where the number of articles of the type is also shown in the label) of the number of articles of the type, and c) a dynamic key having a label with a designation of a type of information selected from the group consisting of: identification of means of transportation, currency, date, time, seat identification, passenger identification, and departure station, together with specific information of the type, activation of the key permitting change of the specific information;

the dynamic key being further activatable for entering a first amount paid by a customer and the payment currency of the first amount.

32. The system of claim 31, further comprising means for displaying, in a selected reference currency, the remaining amount to be paid after payment of the first amount.

33. A system for performing and recording transactions in connection with the vending of articles, the system comprising computer means, display means, input means and output means, at least part of the input means comprising:

a dynamic key displayed in the display means, the dynamic key being activatable to cause input to the computer means by interaction, by external pointing means, with at least part of the area of the display means occupied by the key;

the dynamic key having a label, the contents of the label being related to the context in which the dynamic key is displayed, the dynamic key being selected from the group consisting of:

a) a dynamic key having a label with an identification of a type of article together with a selected number of articles of the type, activation of the key causing incrementation or decrementation of the number of articles of the type to be input to the computer means, b) a dynamic key having a label with an identification of the type of article together with the price, in a selected currency, of an article of the type or (where the number of articles of the type is also shown in the label) of the number of articles of the type, and c) a dynamic key having a label with a designation of a type of information selected from the group consisting of: identification of means of transportation, currency, date, time, seat identification, passenger identification, and departure station, together with specific information of the type, activation of the key permitting change of the specific information;

the dynamic key being further activatable for entering a first amount paid by a customer and the payment currency of the first amount; and the dynamic key being still further activatable for entering a second amount to be paid with a credit card and the payment currency of the second amount.

34. The system of claim 33, further comprising means for displaying, in a selected reference currency, the remaining amount to be paid after payment of the first amount and after payment of the second amount.

* * * * *